United States Patent [19]

Mc Leod

[11] 4,002,294
[45] Jan. 11, 1977

[54] GROVE IRRIGATION SYSTEM
[76] Inventor: Elbert (Bert) Alvin Mc Leod, P.O. Box 447, Frostproof, Fla. 33843
[22] Filed: June 25, 1975
[21] Appl. No.: 590,025
[52] U.S. Cl. .............................. 239/104; 239/201; 239/207; 239/275; 210/409
[51] Int. Cl.² .................. B05B 15/02; B05B 15/06
[58] Field of Search .......... 239/104, 119, 200–202, 239/207, 273, 275, 276, 289; 210/332, 334, 354, 391, 397, 409–411, 457

[56] References Cited
UNITED STATES PATENTS

| 395,726 | 1/1889 | Walter | 239/276 X |
|---|---|---|---|
| 661,898 | 11/1900 | Tucker | 239/201 X |
| 872,437 | 12/1907 | Leonard | 210/409 |
| 1,078,995 | 11/1913 | Chase | 239/207 |
| 1,111,993 | 9/1914 | Carder | 239/201 X |
| 1,164,128 | 12/1915 | Sexton | 239/207 |
| 1,271,681 | 7/1918 | Duryea | 210/409 X |
| 2,668,078 | 2/1954 | Snoddy | 239/289 X |
| 2,919,704 | 1/1960 | Butler | 239/104 X |
| 2,940,517 | 6/1960 | Skellern | 239/289 |
| 3,423,023 | 1/1969 | Fortier | 239/207 |
| 3,662,956 | 5/1972 | Hedman | 239/201 |
| 3,724,669 | 4/1973 | Thal | 210/409 |
| 3,877,526 | 4/1975 | Dolbeer et al. | 239/207 X |

FOREIGN PATENTS OR APPLICATIONS

| 22,155 | 2/1930 | Australia | 239/207 |
|---|---|---|---|
| 58,510 | 9/1891 | Germany | 239/201 |
| 580,601 | 7/1933 | Germany | 239/201 |

Primary Examiner—Robert S. Ward, Jr.
Attorney, Agent, or Firm—George B. Oujevolk

[57] ABSTRACT

An irrigation system for use in a citrus grove. Water is pumped from a well into a chamber of an elongated filter which has an outer casing and an inner treating unit defining the chamber. The filter also has a spiggot and valve for flushing the filter. Irrigation water goes in one end, through the filter, passing from the chamber into the treating unit and out the other end to a main line. The main line supplies sub-main and branch lines to T-shaped pipes which terminate in posts. Each post has a vertical pipe which emerges from the post and has a spraying head designed to be just above the post. The T-shaped pipes are disposed so that the posts will emerge on both sides of a tree trunk and spray water from both sides onto the tree trunk to feed the roots.

1 Claim, 8 Drawing Figures

GROVE IRRIGATION SYSTEM

BACKGROUND OF THE INVENTION

The present invention relates to irrigation systems and more particularly to citrus grove irrigation systems.

BRIEF DESCRIPTION OF THE PRIOR ART

Present grove irrigation systems attempt to simulate rainfall. Tall, tower-like pipes are disposed in rows in the groves and shower the citrus trees with water. Indeed, these are termed sprinkler systems but they are mainly showering systems. People driving along highways adjacent a grove are often showered with water, but, the water diverted on the highway is not the only water lost. Even moderate winds carry the water out of the range of the roots so that a large amount of water used is lost to the trees and indeed serves to sprout weeds in the grove. Recent studies have shown that it is the tree roots which drink the water. Even a sparse rainfall is sufficient for the leaves, if the roots are well watered.

Another problem which plagues groves has been clogged irrigation lines. Since irrigation lines are very extensive, it is often very difficult to discover just where the line is clogged. A careful study has shown that most of the clogging material originates in the wells supplying irrigation water. Filters have been tried successfully, but this then requires periodic changing of the filter material. Therefore, what is required in a grove irrigation system is a system which will bring filtered water and fertilizer to the tree roots, i.e., can put water where desired, will conserve water, not waste it, reduce evaporation loss, can run even at high winds, can be used as a fertilizer feed and in the winter, can be used to heat the grove.

SUMMARY OF THE INVENTION

Generally speaking, the present invention contemplates an irrigation system for use in a citrus grove. Water is pumped from a well into a chamber of an elongated filter which has an outer casing and an inner treating unit defining the chamber. The filter also has a spiggot and valve for flushing the filter. Irrigation water goes in one end, through the filter, passing from the chamber into the treating unit and out the other end to a main line. The main line supplies sub-main and branch lines to T-shaped pipes which terminate in posts. Each post has a vertical pipe which emerges from the post and has a spraying head designed to be just above the post. The T-shaped pipes are disposed so that the posts will emerge on both sides of a tree trunk and spray water from both sides onto the tree trunk to feed the roots.

The invention as well as other objects and advantages thereof will be more readily apparent from the following detailed description when taken together with the accompanying drawings, in which:

BRIEF DESCRIPTION OF THE DRAWINGS

FIG. 2b shows a sectional view of the filter depicted in FIG. 2a;

FIG. 3b presents in perspective a slightly modified version of the post shown in FIG. 3a;

DETAILED DESCRIPTION

Principal Components of the System

Figure 1:
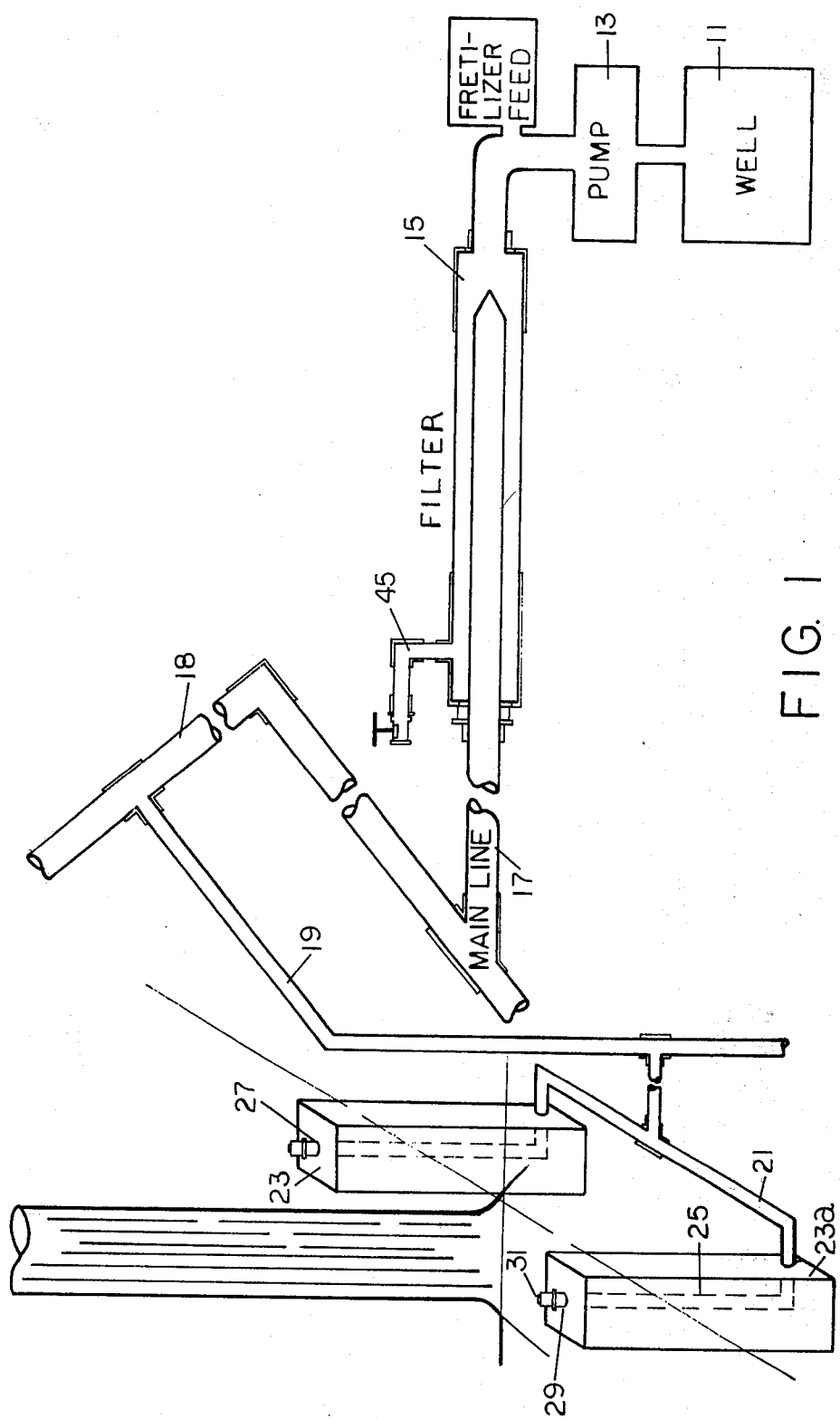
FIG. 1 is a partly perspective, partly block diagram, partly flow sheet explanation of the inventive concept.
Figure 2A:
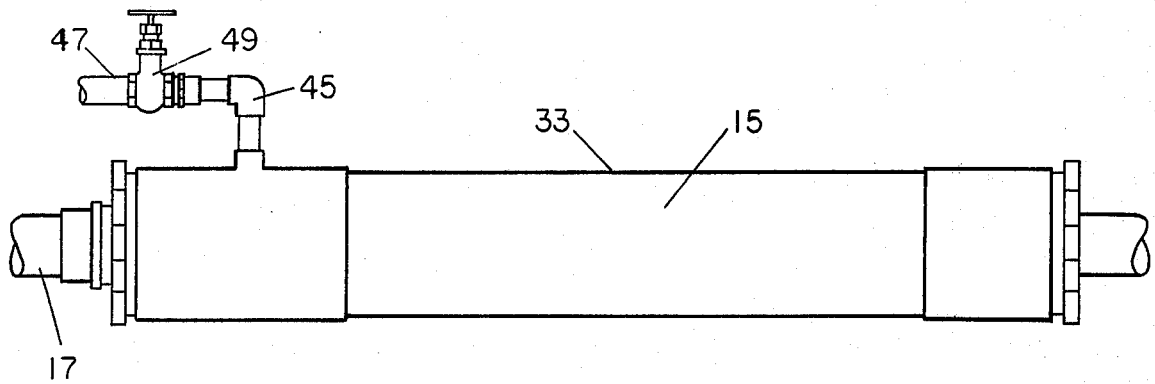
FIG. 2a is a longitudinal perspective view of the filter used herein.
Figure 2B:
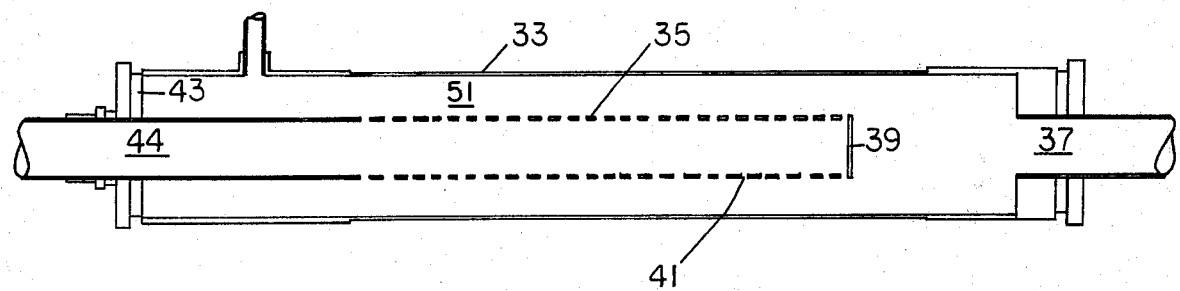
Figure 3A:
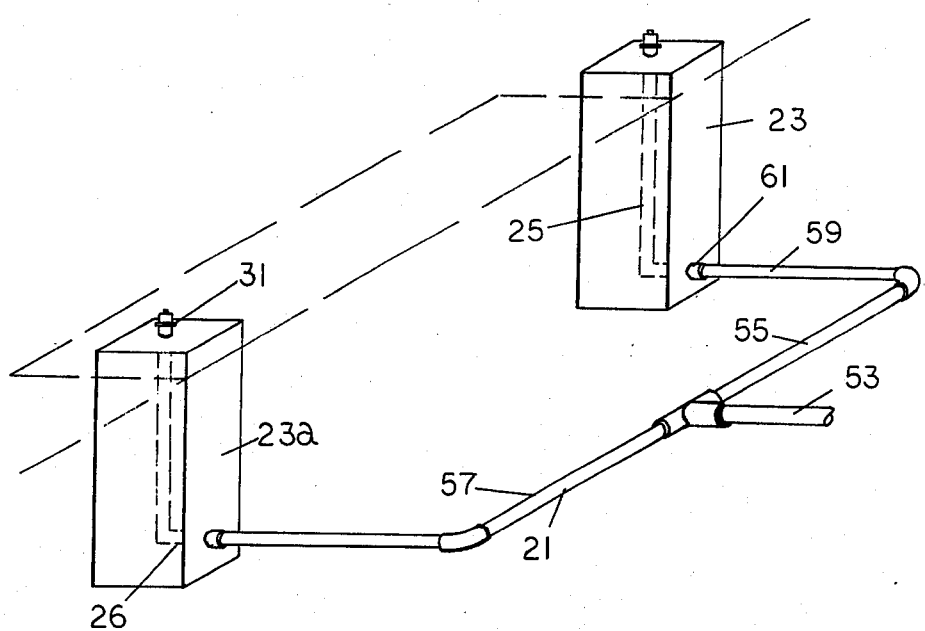
FIG. 3a illustrates in perspective a post useful herein.
Figure 3B:
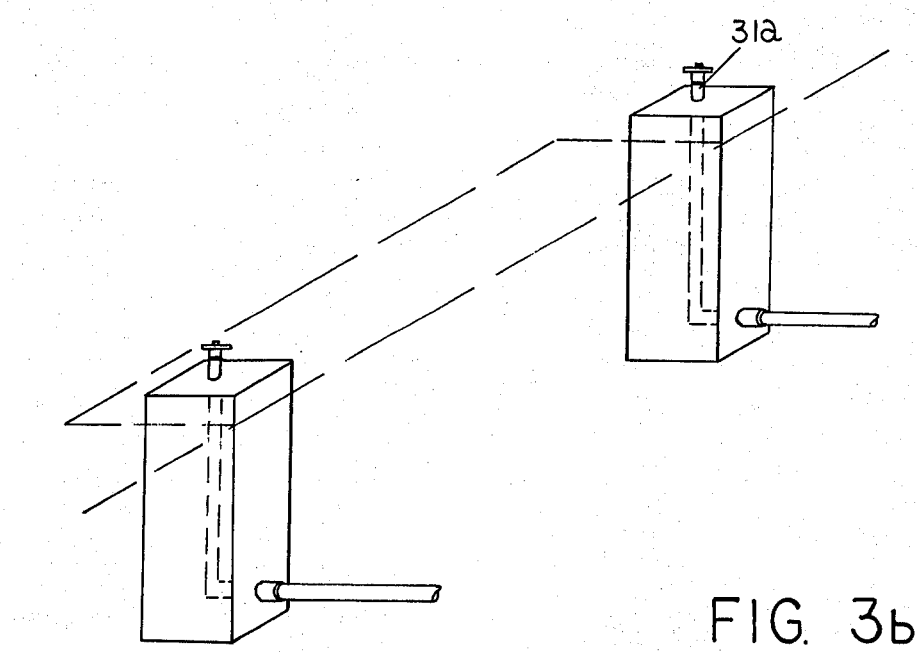
Figure 4A:
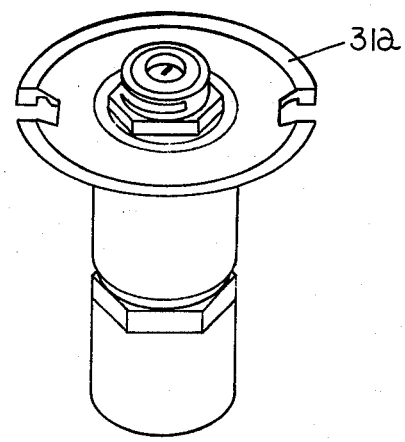
FIG. 4a illustrates in perspective a sprayer head used in the invention.
Figure 4B:
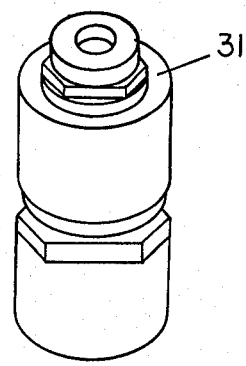
FIG. 4b again presents in perspective another version of a sprayer head useful herein; and, FIG. 5 is a layout of a citrus grove using the inventive concept.
Figure 5:
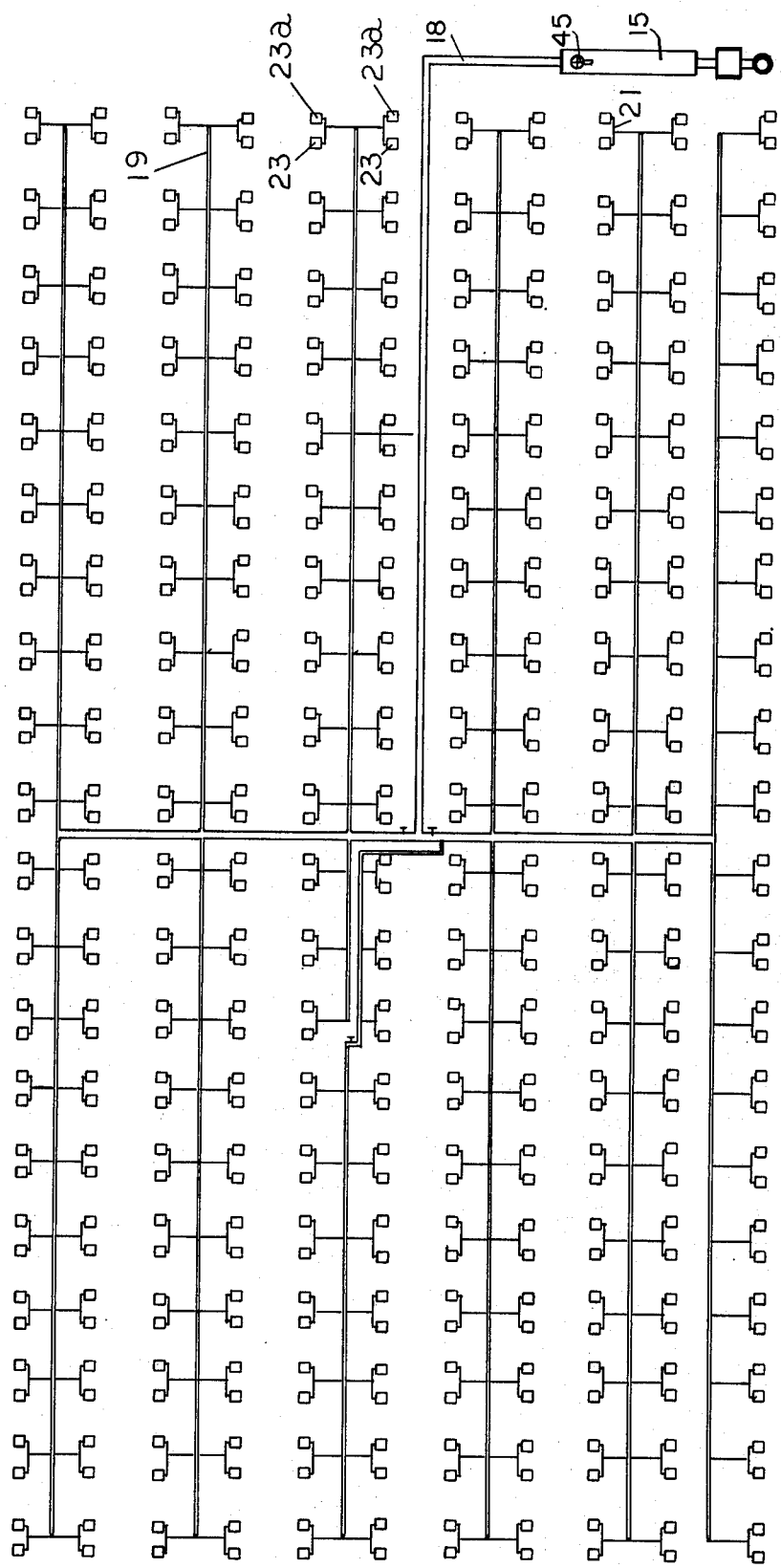

The principal components of the system are shown in FIG. 1. Water is obtained from a source, e.g., a well 11 by a pump 13 and pumped into a filter 15. Filter 15 feeds the water to a main line 17, having branch lines 19 and sub-branches. Finally the water reaches a T-shaped outlet pipe 21. The water goes through both arms of the outlet pipe, one arm of which goes into a post 23. The water moves up a vertical pipe in post 23 to an outlet 31. Post 23 is on one side of a tree and a similar post 23a is on the other side fed by the second arm of the T-shaped pipe 21. Post 23 has an extension 27 which extends only a few inches above the ground. Vertical pipe 25 has an upper outlet section 29 extending out of the top of the post extension 29. The water is sprayed from a spraying head 31.

The Filter

Well water used in citrus groves usually contains many minerals and other contaminants. The pump 13 which supplies the water from well 11 feeds the water into filter 15 hereinbefore mentioned. The filter 15 is preferably horizontally disposed and one version has an elongated cylindrical outer casing 33 between about 10 inches to about 24 inches in diameter and about 2 to about 6 feet in length and an inner cylindrical treating unit 35 coaxial with outer casing 33. The inner treating unit 35 has a diameter of between about ¼ to about ¾ that of the outer casing 33. Entrance to the filter 15 is at one end of the outer casing 33 which preferably has a neck defining an entry port 37. The inner treating unit 35 is dead ended near this neck by an end wall 39. The inner treating unit 35 further has a plurality of small filter apertures 41 around the unit. The outer casing is dead ended at the other end, i.e., the exit end of the filter 15 by a casing wall 43, which has an exit port 44. The filter apertures 41 do not extend to the casing wall 43 but end somewhere about ¾ the length of the inner treating unit 35. The filter 15 can be either above or below ground and extending out of the filter 15 is a spigot 45 with a delivery nozzle 47 extending parallel to the longitudinal plane of the filter 15. The spigot 45 is controlled by a valve 49. The space between the inner treating unit 35 and the outer casing 33 defines a filter chamber 51. Water pumped through the entry port 37 travels outside the inner filter unit to the end of the chamber 51 and pump pressure then forces the water through the apertures 41 into the inner treating unit 35. Pump pressure then forces the water out of the filter into the main line 17. Gradually contaminants will build up within the chamber 51. Valve 49 is then opened and the water pressure forces these contaminants out of the delivery nozzle 47, thus flushing out the filter chamber 51.

The Irrigation Field

The water from filter 15 goes through main line 17 into sub-main lines 18 and branch lines 19. These sub-main lines are usually parallel and the branch lines 19 will usually terminate in the T-shaped connection 21. This connection is preferably a plastic pipe and one version in use is about one-half to two inches inner diameter having a main portion 53 about a foot or two long ending in another similar pipe sections 55 and 57 which are at right angles to the main portion 53. Each of these pipe sections 55, 57 have a connection 59 which can be coupled to a union 61.

The Posts

Posts 23 are made of a concrete block with a plastic pipe 25 inside. The concrete block is of rectangular shape about three inches to one foot square at the ends and from one to four feet long. Plastic pipe 25 has an elbow 26 which may come with the pipe, or be formed by a union. The elbow 26 exits from the side of the block from two to ten inches from the bottom end. The post 23 is buried in the ground leaving only a small post extension 27 above the ground. Pipe 25 has a pipe outlet integral with the pipe which extends above the post extension and is coupled to a plastic spraying head 31.

Plastic spraying head 31 can consist of a mere cylindrical outlet spanning an arc of between 45° to 180° of the cylinder circumference or can consists of a cylindrical head 31a with a flange. The flange is used to direct the water to the position desired. It has been found however, that the flange tends to hold or attract contaminants such as insects, dirt, grass which may clog up the head. These spraying heads are available commercially and can run about 37 cents a piece. Since the post can be molded for about 50 cents a piece, each post and spraying head combination will run under one dollar apiece.

One advantage of the present system is that liquid fertilizer can be fed through between the pump and the filter either with water or alone, and thus fed to the tree roots.

I claim:

1. An irrigation system including an elongated filter (15) comprising:
    a. an elongated cylindrical outer casing (33) having input and output ports (37,44) at the longitudinal ends thereof;
    b. an elongated cylindrical inner treating unit (35) longitudinally disposed in said outer casing, one end of said inner treating unit associated with said output port, the other end of said inner treating unit having an end wall with samll filter apertures (41) on said inner treating unit extending from said end wall along a substantial length of said inner treating unit but less than the entire length of the inner treating unit, so that said filter apertures prevent undesirable particles from entering said inner treating unit, an outer chamber defined by said outer casing and said treating unit wherein said outer chamber is adapted to receive fluid from said input port (37) into said outer chamber;
    c. spigot valve means attached to said outer casing along the circumference of said outer casing near the longitudinal end associated with the output port and furthest from said filter apertures, for controlling fluid flow from said outer chamber through said filter apertures into said inner treating unit, and into said output port when said valve means is in its closed position, and for controlling fluid flow from said outer chamber through said spigot and valve means, when said valve means is in its open position, so as to flush out undesirable particles from the outer chamber;
    d. an elongated rectangular concrete block post (23), a longitudinal post pipe (25) in said post, said post pipe extending outwardly of said block post, a spray head (31) spanning an arc between 45° to 180 ° attached to the outwardly extending end of said post pipe, a pipe elbow (26) connected to the other end of said post pipe; and,
    e. piping means for coupling said pipe elbow (26) to the output port (44) of said elongated cylindrical outer casing which comprises, a main pipe line (17) connected to said output port, a T-shaped connection (21) coupled to said main pipe line having at least one connection pipe connected to said pipe elbow (26), whereby the system is adapted to provide fluid to the roots of trees.

* * * * *